United States Patent
Ishida et al.

(10) Patent No.: US 8,721,487 B2
(45) Date of Patent: May 13, 2014

(54) STRADDLE-TYPE VEHICLE

(71) Applicant: Yamaha Hatsudoki Kabushiki Kaisha, Shizuoka-ken (JP)

(72) Inventors: Yousuke Ishida, Shizuoka-ken (JP); Toshinori Inomori, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 13/900,164

(22) Filed: May 22, 2013

(65) Prior Publication Data
US 2013/0345012 A1    Dec. 26, 2013

(30) Foreign Application Priority Data
Jun. 20, 2012   (JP) ................................ 2012-138980

(51) Int. Cl.
   *F16H 3/74*   (2006.01)
(52) U.S. Cl.
   USPC .......................................... 475/258; 475/267
(58) Field of Classification Search
   USPC ......... 475/198, 207, 210, 211, 213, 218, 258, 475/267, 329, 343, 346
   See application file for complete search history.

(56) References Cited

U.S. PATENT DOCUMENTS

| | | | |
|---|---|---|---|
| 3,850,050 A | 11/1974 | Lemmens | |
| 4,973,288 A * | 11/1990 | Sakakibara et al. | 474/8 |
| 5,024,638 A | 6/1991 | Sakakibara et al. | |
| 7,347,800 B2 * | 3/2008 | Jackson | 475/210 |
| 2004/0127321 A1 * | 7/2004 | Morscheck | 475/210 |
| 2006/0234822 A1 | 10/2006 | Morscheck et al. | |
| 2008/0108463 A1 | 5/2008 | Unno | |

FOREIGN PATENT DOCUMENTS

| | | |
|---|---|---|
| EP | 1 770 307 A1 | 4/2007 |
| JP | 2005-164014 A | 6/2005 |
| JP | 2007-198446 A | 8/2007 |
| JP | 2012-017855 A | 1/2012 |
| WO | 2006/003904 A1 | 1/2006 |

OTHER PUBLICATIONS

An Extended European Search Report issued on Sep. 11, 2013.
Foreign Office Action issued on Nov. 19, 2013 with an English translation.

* cited by examiner

*Primary Examiner* — Justin Holmes
(74) *Attorney, Agent, or Firm* — Rabin & Berdo, P.C.

(57) ABSTRACT

A straddle-type vehicle is disclosed. The straddle-type vehicle has a planetary gear mechanism having a ring gear rotatable with a crankshaft, a sun gear, and at least two planetary gears. The straddle-type vehicle also has a planetary carrier, a rotary shaft rotating with the sun gear, an output shaft rotating with the planetary carrier, and a CVT having a primary shaft rotatable with the rotary shaft. The straddle-type vehicle further has a primary pulley, a secondary shaft rotatable with the crankshaft, a secondary pulley, and a belt. The straddle-type vehicle additionally has an actuator configured to change a transmission gear ratio of the CVT. The crankshaft, the planetary gear mechanism, the rotary shaft, and the belt-type continuously variable transmission form a cyclic power transmission passage. A centrifugal clutch is disposed within the passage.

14 Claims, 7 Drawing Sheets

STRADDLE-TYPE VEHICLE

TECHNICAL FIELD

The present invention relates to a straddle-type vehicle equipped with a continuously variable transmission.

This application claims priority from Japanese Patent Application No. 2012-138980, filed on Jun. 20, 2012, which is incorporated by reference herein in its entirety.

BACKGROUND ART

Conventionally, straddle-type vehicles having belt-type continuously variable transmissions are known (for example, see WO/2006/003904). With a belt-type continuously variable transmission, the transmission gear ratios can be continuously varied, and the transmission gear ratio can be set at any given value.

The belt-type continuously variable transmission has a primary pulley, a secondary pulley, and a belt wrapped around the primary pulley and the secondary pulley. The transmission gear ratio can be changed by appropriately changing the winding diameter of the belt on the primary pulley and the secondary pulley. The mechanical power of the primary pulley is transmitted to the secondary pulley through the belt.

SUMMARY OF INVENTION

Technical Problem

When the power to be transmitted by the belt-type continuously variable transmission becomes greater, the tension applied to the belt becomes accordingly greater. Yet, the belt is a component with relatively low durability. Because the belt is prevented from receiving excessively high tension, there has been a certain limit to the attempt of increasing the transmission power of the belt-type continuously variable transmission. However, there is a need for a straddle-type vehicle that can transmit greater mechanical power from the engine to the driving wheel while taking advantage of the continuously variable transmission.

The present invention has been accomplished in view of the foregoing and other problems, and it is an object of the invention to provide a straddle-type vehicle equipped with a continuously variable transmission that can transmit a greater mechanical power.

Solution to Problem

The present invention provides a straddle-type vehicle comprising: an engine having a crankshaft; a planetary gear mechanism having a ring gear rotatable with the crankshaft, a sun gear disposed concentrically with the ring gear, at least two planetary gears meshing with the ring gear and the sun gear, and a planetary carrier rotatably and revolvably supporting the planetary gears and rotating in association with revolution of the planetary gears; a rotary shaft rotating with the sun gear; an output shaft rotating with the planetary carrier; a belt-type continuously variable transmission comprising a primary shaft rotatable with the rotary shaft, a primary pulley attached to the primary shaft, a secondary shaft rotatable with the crankshaft, a secondary pulley attached to the secondary shaft, and a belt wrapped around the primary pulley and the secondary pulley; an actuator configured to change a transmission gear ratio of the belt-type continuously variable transmission; a cyclic power transmission passage comprising the crankshaft, the planetary gear mechanism, the rotary shaft, and the belt-type continuously variable transmission; and a centrifugal clutch disposed in the cyclic power transmission passage.

When transmitting mechanical power of the crankshaft to the output shaft, the straddle-type vehicle according to the present invention allows the mechanical power of the crankshaft to be transmitted to the output shaft through the planetary gear mechanism as well as through the belt-type continuously variable transmission. As a result, in comparison with the case in which the mechanical power of the crankshaft is transmitted to the output shaft only through the belt-type continuously variable transmission as in the conventional cases, the tension to the belt can be reduced when the same level of mechanical power is transmitted to the output shaft. Therefore, even with such a level of mechanical power that cannot be transmitted in the conventional configuration when taking the durability of the belt into consideration because of excessively high tension to the belt, the tension to the belt is reduced in the above-described straddle-type vehicle. For this reason, the mechanical power can be transmitted to the output shaft without applying an excessive load to the belt.

In one embodiment of the present invention, the centrifugal clutch is connected to the rotary shaft and the primary shaft.

Because the mechanical power of the crankshaft is transmitted to the rotary shaft and the primary shaft through different passages to rotate the rotary shaft and the primary shaft, the rotary shaft and the primary shaft rotate at different numbers of revolutions at the time of starting the engine. At this time, the centrifugal clutch, which is connected to the rotary shaft and the primary shaft, is not engaged, so the planetary carrier of the planetary gear mechanism does not rotate. When the centrifugal clutch is engaged, the rotary shaft and the primary shaft rotate at the same numbers of revolutions, causing the planetary gears to revolve and thereby enabling the output shaft to rotate.

In one embodiment of the present invention, each of the crankshaft, the rotary shaft, the output shaft, the primary shaft, and the secondary shaft extends in a transverse direction; and the primary pulley is disposed to either one of the left and right of the centrifugal clutch, and the planetary gear mechanism is disposed to the other one of the centrifugal clutch.

By disposing the centrifugal clutch between the primary pulley and the planetary gear mechanism in this way, the size of the cyclic power transmission passage can be maintained at a relatively small size.

In one embodiment of the present invention, each of the crankshaft, the rotary shaft, the output shaft, the primary shaft, and the secondary shaft extends in a transverse direction, a rightmost end of the centrifugal clutch is positioned more rightward than a leftmost end of the crankshaft, and a leftmost end of the centrifugal clutch is positioned more leftward than a rightmost end of the crankshaft.

Thus, the centrifugal clutch is disposed between the rightmost end and the leftmost end of the crankshaft. As a result, the size of the cyclic power transmission passage can be kept relatively small.

In one embodiment of the present invention, at least a portion of the centrifugal clutch overlaps the primary pulley as viewed from one side of the vehicle.

Therefore, the cyclic power transmission passage can be made compact in size.

In one embodiment of the present invention, at least a portion of the planetary gear mechanism overlaps the primary pulley as viewed from one side of the vehicle.

Therefore, the cyclic power transmission passage can be made compact in size.

In one embodiment of the present invention, the straddle-type vehicle further has a balancer interposed between the crankshaft and the ring gear.

Therefore, vibrations of the engine can be canceled out, and the mechanical power of the crankshaft can be transmitted to the planetary gear mechanism through the balancer.

In one embodiment of the present invention, the actuator overlaps neither the primary pulley nor the secondary pulley as viewed from one side of the vehicle.

Therefore, the cyclic power transmission passage can be made compact in size.

In one embodiment of the present invention, at least a portion of the actuator is disposed above the primary pulley as viewed from one side of the vehicle.

Therefore, the cyclic power transmission passage can be made compact in size.

In one embodiment of the present invention, the primary shaft is disposed behind the secondary shaft, and the actuator is disposed more frontward than the shaft center of the primary shaft and more rearward than the shaft center of the secondary shaft.

Therefore, the cyclic power transmission passage can be made compact in size.

In one embodiment of the present invention, each of the crankshaft, the rotary shaft, the output shaft, the primary shaft, and the secondary shaft extends in a transverse direction, and the primary shaft is disposed behind the secondary shaft.

Therefore, the cyclic power transmission passage can be made compact in size.

In one embodiment of the present invention, each of the crankshaft, the rotary shaft, the output shaft, the primary shaft, and the secondary shaft extends in a transverse direction, the primary shaft is disposed behind the secondary shaft, and the shaft center of the crankshaft is positioned more frontward than the shaft center of the primary shaft and more rearward than the shaft center of the secondary shaft.

Therefore, the cyclic power transmission passage can be made compact in size.

In one embodiment of the present invention, the straddle-type vehicle further has a first gear provided on the crankshaft, and a second gear provided on the secondary shaft and meshing with the first gear.

Because the first gear of the crankshaft and the second gear of the secondary shaft mesh with each other in this way, the mechanical power of the crankshaft can be directly transmitted to the secondary shaft.

Advantageous Effects of Invention

As described above, the present invention makes it possible to provide a straddle-type vehicle equipped with a continuously variable transmission that can transmit a greater mechanical power.

DESCRIPTION OF EMBODIMENTS

First Embodiment

Figure 1:
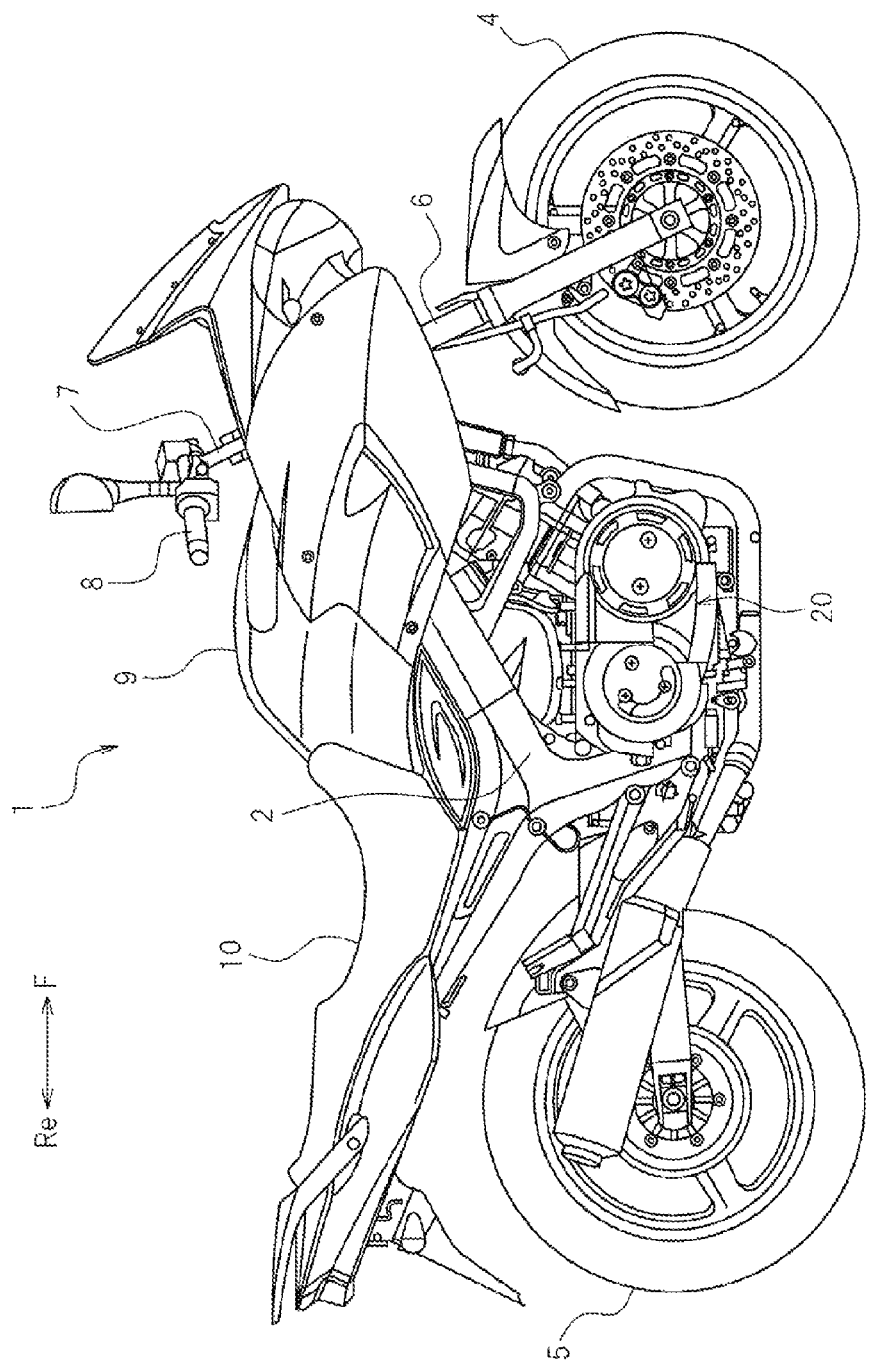
FIG. 1 is a right side view illustrating a motorcycle according to one embodiment of the present invention.

As illustrated in FIG. 1, the straddle-type vehicle according to the present embodiment is a motorcycle 1. The motorcycle 1 may be a sport-type motorcycle. However, the motorcycle 1 may also be another type of motorcycle. The motorcycle 1 may be an off-road type motorcycle, a moped type motorcycle, or a scooter type motorcycle. The term "motorcycle" is a generic term for the vehicles whose vehicle body is to be leaned when making a turn. The term "motorcycle" herein means to include a three-wheeled vehicle of the type whose vehicle body is to be leaned when making a turn. The straddle-type vehicle according to the present invention is not limited to a motorcycle. The straddle-type vehicle according to the present invention may be another type vehicle on which a rider straddles to ride. The straddle-type vehicle according to the present invention may be, for example, an ATV (All Terrain Vehicle).

In the following description, the terms "front," "rear," "left," and "right" respectively refer to front, rear, left, and right as defined based on the perspective of the rider seated on a seat 10, unless specifically indicated otherwise. Reference characters F, Re, L, and R indicate front, rear, left, and right, respectively.

Figure 2:
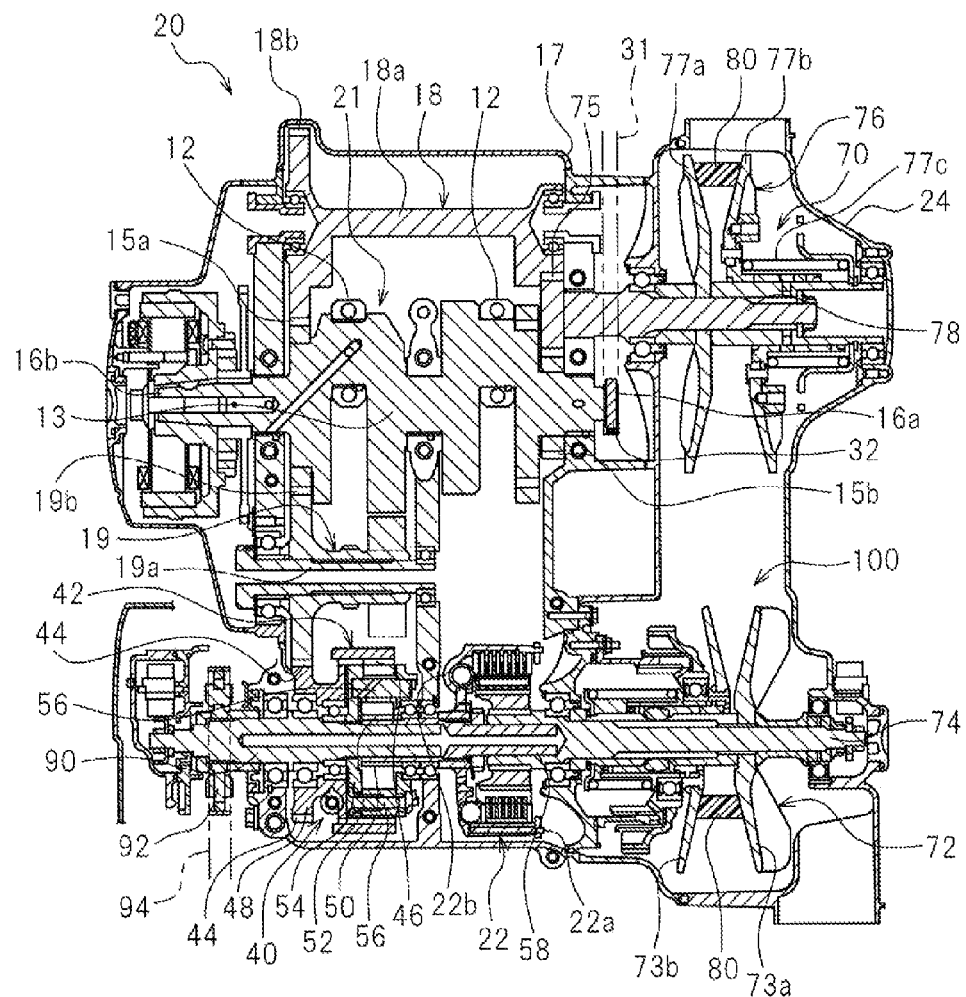
FIG. 2 is a horizontal cross-sectional view illustrating an engine unit according to one embodiment of the present invention.

As illustrated in FIG. 1, the motorcycle 1 has a body frame 2, an engine unit 20 supported by the body frame 2, a front wheel 4, and a rear wheel 5. The front wheel 4 is rotatably fitted to a lower end portion of the front fork 6. Although not shown in the drawings, a head pipe is coupled to a front end portion of the body frame 2. A steering shaft 7 is inserted through the head pipe. A handlebar 8 is secured to the steering shaft 7. A lower end portion of the steering shaft 7 is connected to an upper end portion of the front fork 6 via a bracket. A fuel tank 9 is provided behind the steering shaft 7. A seat 10 is provided behind the fuel tank 9. The fuel tank 9 and the seat 10 are supported by the body frame 2. The engine unit 20 is coupled to the rear wheel 5 so as to be capable of transmitting mechanical power. As illustrated in FIG. 2, the engine unit 20 has an output shaft 90 that rotates together with a later-described planetary carrier 54. A sprocket 92 is fitted to the output shaft 90. The sprocket 92 and the rear wheel 5 are coupled to each other by a chain 94. The mechanical power of the engine unit 20 is transmitted through the chain 94 to the rear wheel 5. The mechanism for transmitting mechanical power from the output shaft 90 to the rear wheel 5 is not limited to the chain 94, but may be another type of mechanism such as, for example, a transmission belt, a drive shaft, and a gear mechanism.

FIG. 2 is a horizontal cross-sectional view of a primary portion of the engine unit 20. As illustrated in FIG. 2, the engine unit 20 has an engine 21 having a crankshaft 13, a planetary gear mechanism 40, a centrifugal clutch 22, a belt-type continuously variable transmission 70 (hereinafter referred to as "CVT"), and the output shaft 90. In the present embodiment, the crankshaft 13, the planetary gear mechanism 40, a rotary shaft 58, and the CVT 70 constitute a cyclic power transmission passage 100. The centrifugal clutch 22 is disposed within the cyclic power transmission passage 100. Each of the crankshaft 13, the output shaft 90, and the rotary shaft 58 extends in a transverse direction (in a vehicle width direction).

Figure 4:
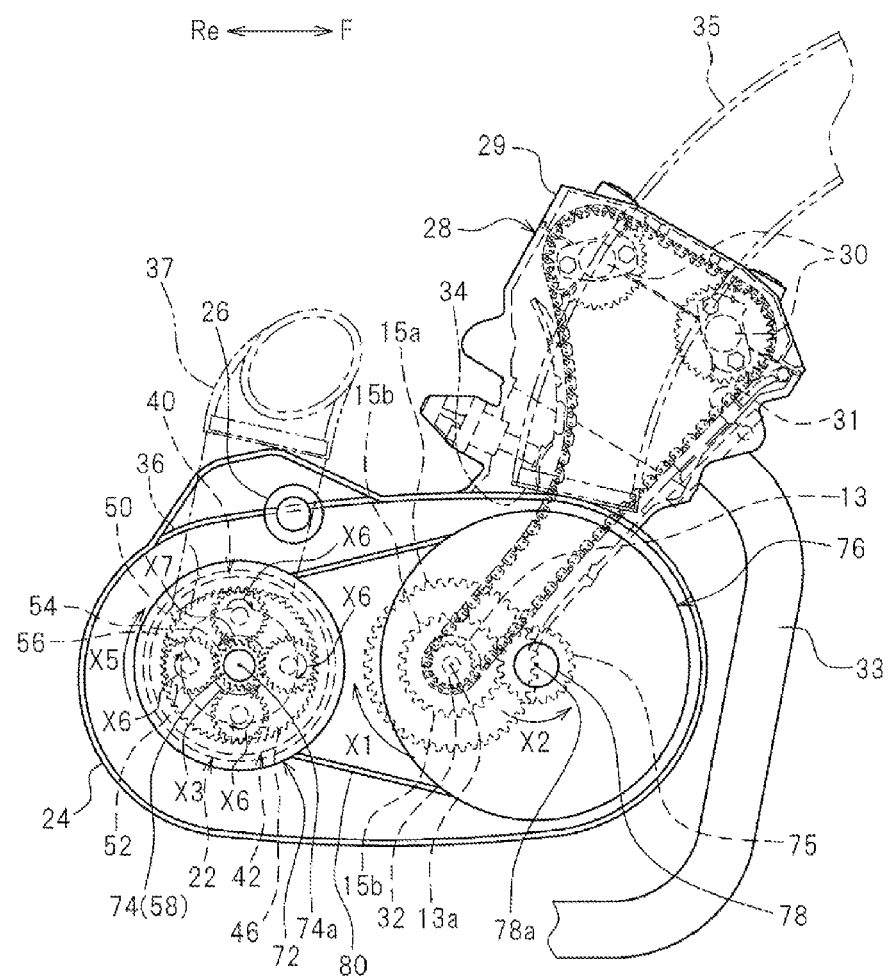
FIG. 4 is a schematic side view illustrating the engine unit according to one embodiment of the present invention.

The engine 21 includes cylinders (not shown), pistons (not shown) that reciprocate in the cylinders, and connecting rods 12 connecting the pistons and the crankshaft 13 to each other. In the present embodiment, the engine 21 may be a two-cylinder engine (one example of multi-cylinder engine). However, it is also contemplated that the engine 21 may be a single-cylinder engine. The crankshaft 13 extends in a transverse direction. The crankshaft 13 is accommodated in a crankcase 17. As illustrated in FIG. 4, the shaft center 13a of the crankshaft 13 of the present embodiment is positioned more frontward than the shaft center 74a of a later-described primary shaft 74 and more rearward than the shaft center 78a of a later-described secondary shaft 78.

Figure 3:
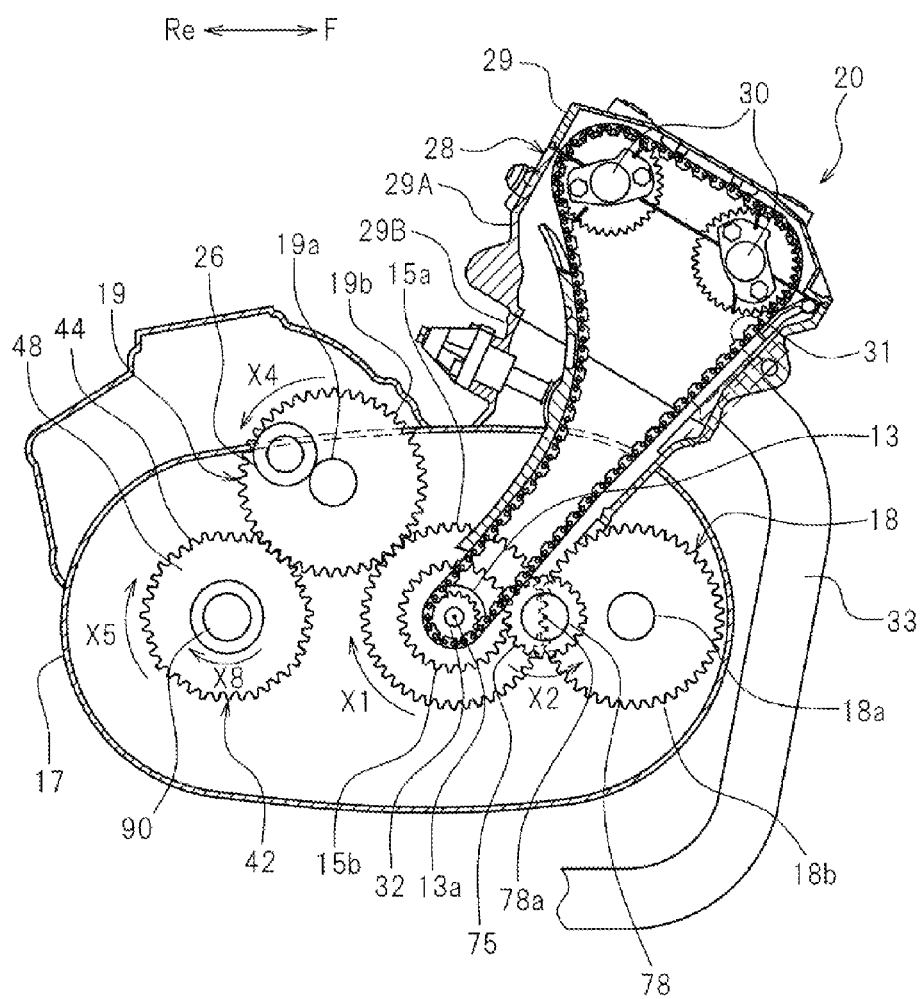
FIG. 3 is a vertical cross-sectional view illustrating the engine unit according to one embodiment of the present invention.

As illustrated in FIG. 3, the engine unit 20 has a cylinder unit 28 comprising a cylinder block 29B, a cylinder head 29A, and a cylinder head cover 29. Camshafts 30 are disposed freely rotatably in the cylinder head 29A and the cylinder head cover 29. The camshafts 30 and the crankshaft 13 are coupled to each other via a cam chain 31. The cam chain 31 is wrapped around a cam chain sprocket 32, which is integrally formed with the crankshaft 13. An exhaust pipe 33 is connected to the cylinder head 29A. The exhaust pipe 33 is connected to a muffler, not shown.

A first balancer 18 is disposed in front of the crankshaft 13. A second balancer 19 is disposed behind the crankshaft 13. The first balancer 18 and the second balancer 19 serves the role of cancelling out vibrations of the engine 21. The first balancer 18 has a shaft portion 18a, which extends in a transverse direction, and a gear portion 18b, which has a larger diameter than the shaft portion 18a. The second balancer 19 has a shaft portion 19a, which extends in a transverse direction, and a gear portion 19b, which has a larger diameter than the shaft portion 19a. A first gear 15a is fixed to the crankshaft 13. Each of the gear portion 18b of the first balancer 18 and the gear portion 19b of the second balancer 19 meshes with the first gear 15a. The first balancer 18 and the second balancer 19 are configured to rotate with the crankshaft 13.

As illustrated in FIG. 2, a belt chamber 24 is provided to the right of the crankcase 17. The CVT 70 is disposed in the belt chamber 24. The CVT 70 has a primary pulley 72 disposed rearward of the vehicle, a secondary pulley 76 disposed in front of the primary pulley 72, and a belt 80 wrapped around the primary pulley 72 and the secondary pulley 76. The primary pulley 72 is disposed to the right of the centrifugal clutch 22. The type of the belt 80 may be any suitable type of belt such as, for example, a rubber belt or a plastic block belt. The term "primary pulley" means one of the pulleys whose belt winding diameter is changed forcibly, and the term "secondary pulley" means one of the pulleys whose belt winding diameter changes according to the change of the belt winding diameter of the primary pulley. In other words, the term "primary pulley" refers to one of the pulleys whose belt groove is changed forcibly, and the term "secondary pulley" refers to one of the pulleys whose belt groove is changed by the belt that is wrapped around both of the pulleys.

As illustrated in FIG. 4, a suction port 34 is formed in an upper front portion of the belt chamber 24, and an outlet port 36 is formed in an upper rear portion of the belt chamber 24. An air intake duct 35 that forms an air intake passage for introducing cooling air is connected to the suction port 34. An air exhaust duct 37 that forms an air exhaust passage for discharging the air inside the belt chamber 24 is connected to the outlet port 36.

As illustrated in FIG. 2, the primary pulley 72 is attached to the primary shaft 74 that is rotatable with the rotary shaft 58. The primary pulley 72 has a stationary sheave 73a and a movable sheave 73b that is movable in axial directions (leftward and rightward in FIG. 2) relative to the stationary sheave 73a. The movable sheave 73b and the stationary sheave 73a are coupled to the primary shaft 74. The primary shaft 74 rotates integrally with the movable sheave 73b and the stationary sheave 73a. The primary shaft 74 is directly or indirectly coupled to the rotary shaft 58, which rotates with a sun gear 50 of the planetary gear mechanism 40. The phrase "directly coupled to" means that the primary shaft 74 is coupled to the rotary shaft 58 without any other member interposed therebetween, while the phrase "indirectly coupled to" means that the primary shaft 74 is coupled to the rotary shaft 58 via another member. The primary shaft 74 rotates by receiving the mechanical power of the crankshaft 13 through the belt 80. The primary shaft 74 extends in a transverse direction (in a vehicle width direction).

The secondary pulley 76 is attached to the secondary shaft 78. The secondary shaft 78 is disposed in front of the primary shaft 74. The secondary pulley 76 has a stationary sheave 77a and a movable sheave 77b that is movable in axial directions (leftward and rightward in FIG. 2) relative to the stationary sheave 77a. The movable sheave 77b is urged toward the stationary sheave 77a by a spring 77c. The movable sheave 77b and the stationary sheave 77a are coupled to the secondary shaft 78. The movable sheave 77b and the stationary sheave 77a rotate with the secondary shaft 78. A secondary gear 75, which meshes with a second gear 15b of the crankshaft 13, is provided on the secondary shaft 78. The secondary shaft 78 rotates by receiving the mechanical power of the crankshaft 13. The secondary shaft 78 extends in a transverse direction (in a vehicle width direction). Note that the secondary shaft 78 may be formed of a portion of the crankshaft 13. In this case, the shaft center 13a of the crankshaft 13 and the shaft center 78a of the secondary shaft 78 may match each other.

When the gap between the movable sheave 73b and the stationary sheave 73a of the primary pulley 72 and the gap between the movable sheave 77b and the stationary sheave 77a of the secondary pulley 76 change, the transmission gear ratio (reduction gear ratio) of the CVT 70 accordingly changes. In the present embodiment, the transmission gear ratio of the CVT 70 is changed by an electric motor 26 (see FIG. 3), which operates as an actuator. The electric motor 26 can bring the movable sheave 73b of the primary pulley 72 close to and away from the stationary sheave 73a. When the electric motor 26 brings the movable sheave 73b close to the stationary sheave 73a, the gap between the movable sheave 73b and the stationary sheave 73a becomes narrower. Accordingly, the belt winding diameter of the primary pulley 72 becomes larger, and the belt winding diameter of the secondary pulley 76 becomes smaller. Conversely, when the electric motor 26 brings the movable sheave 73b away from the stationary sheave 73a, the gap between the movable sheave 73b and the stationary sheave 73a becomes wider. Accordingly, the belt winding diameter of the primary pulley 72 becomes smaller, and the belt winding diameter of the secondary pulley 76 becomes larger. Thus, the transmission gear ratio is changed by changing the belt winding diameters of the primary pulley 72 and the secondary pulley 76. Unlike the centrifugal CVT, this CVT 70 can change the transmission gear ratio irrespective of the number of revolutions of the crankshaft 13. Note that FIG. 2 depicts the conditions in which the front portion and the rear potion of the primary pulley 72 are at different transmission gear ratios. The same applies to the secondary pulley 76.

As illustrated in FIG. 2, the planetary gear mechanism 40 is disposed behind the crankshaft 13 and the second balancer 19. The planetary gear mechanism 40 has a ring gear 42, the sun gear 50, planetary gears 52, and the planetary carrier 54. The ring gear 42 is rotatable with the crankshaft 13. The sun gear 50 is disposed concentrically with the ring gear 42. The planetary gears 52 mesh with the ring gear 42 and the sun gear 50. The planetary carrier 54 rotatably and revolvably supports the planetary gears 52. The planetary carrier 54 rotates in association with revolution of the planetary gears 52. The planetary gear mechanism 40 is disposed to the left of the centrifugal clutch 22. Note that when the primary pulley 72 is disposed to the left of the centrifugal clutch 22, the planetary gear mechanism 40 may be disposed to the right of the centrifugal clutch 22.

The ring gear 42 has a main portion 48 that rotates about the shaft center of the output shaft 90, a first ring gear 44 that meshes with the gear portion 19b of the second balancer 19, and a second ring gear 46 that meshes with the planetary gears 52. The second balancer 19 is disposed between the crankshaft 13 and the ring gear 42. The ring gear 42 rotates by receiving the mechanical power of the crankshaft 13 that is transmitted through the second balancer 19.

As illustrated in FIG. 4, four planetary gears 52 are disposed radially inward of the second ring gear 46 and around the sun gear 50. Each of the planetary gears 52 meshes with the second ring gear 46 of the ring gear 42 and also meshes with the sun gear 50. Each of the planetary gears 52 can rotate about each support shaft 56. The support shafts 56 are supported on the planetary carrier 54 in a disk shape. The planetary carrier 54 is coupled to the output shaft 90. The output shaft 90 rotates integrally with the planetary carrier 54. The planetary gear mechanism 40 may have any suitable number of planetary gears such as, for example, four planetary gears 52. Additionally, for example, it is contemplated that the planetary gear mechanism 40 may have three planetary gears or five planetary gears. In addition, the shape of the planetary carrier 54 is not particularly limited as long as it can support the planetary gears 52 and the support shafts 56.

As illustrated in FIG. 2, the sun gear 50 is attached to the rotary shaft 58. A portion of the output shaft 90 is inserted in the interior of one end of the rotary shaft 58. The rotary shaft 58 and the output shaft 90 are not coupled to each other in such a manner that they can rotate integrally with each other, but they are configured to spin freely independently from each other. In the present embodiment, the shaft center of the rotary shaft 58, the shaft center of the output shaft 90, and the shaft center 74a of the primary shaft 74 match each other as viewed from one side of the vehicle.

The centrifugal clutch 22 is connected to the rotary shaft 58 and the primary shaft 74. The rotary shaft 58 and the primary shaft 74 are coupled to each other via the centrifugal clutch 22. The other end of the rotary shaft 58 is inserted in the interior of the primary shaft 74. The rotary shaft 58 and the primary shaft 74 are configured to spin freely independent from each other when the centrifugal clutch 22 is disengaged. By engagement of the centrifugal clutch 22, the rotary shaft 58 and the primary shaft 74 rotate integrally with each other. In the present invention, a rightmost end 22a of the centrifugal clutch 22 is positioned more rightward than a leftmost end 16b of the crankshaft 13, and a leftmost end 22b of the centrifugal clutch 22 is positioned more leftward than a rightmost end 16a of the crankshaft 13. The centrifugal clutch 22 is disposed more rightward than the center portion of the crankshaft 13. A portion of the centrifugal clutch 22 is disposed behind the right connecting rod 12. The portion of the centrifugal clutch 22 and the right connecting rod 12 are disposed at the same position with respect to a transverse direction (vehicle width direction). A portion of the planetary gear mechanism 40 is disposed behind the left connecting rod 12. The portion of the planetary gear mechanism 40 and the left connecting rod 12 are disposed at the same position with respect to a transverse direction (vehicle width direction).

As illustrated in FIG. 4, the centrifugal clutch 22 overlaps the primary pulley 72 as viewed from one side of the vehicle. Herein, the entirety of the centrifugal clutch 22 overlaps the primary pulley 72 as viewed from one side of the vehicle. However, the invention is not limited to such an embodiment. For example, it is also contemplated that at least a portion of the centrifugal clutch 22 overlaps the primary pulley 72.

As illustrated in FIG. 4, the planetary gear mechanism 40 overlaps the primary pulley 72 as viewed from one side of the vehicle. Herein, the entirety of the planetary gear mechanism 40 overlaps the primary pulley 72 as viewed from one side of the vehicle. However, the invention is not limited to such an embodiment. For example, it is also contemplated that at least a portion of the planetary gear mechanism 40 overlaps the primary pulley 72.

As illustrated in FIG. 4, the electric motor 26 overlaps neither the primary pulley 72 nor the secondary pulley 76 as viewed from one side of the vehicle. In addition, at least a portion of the electric motor 26 is disposed above the primary pulley 72 as viewed from one side of the vehicle. Moreover, the electric motor 26 is disposed more frontward than the shaft center 74a of the primary shaft 74 and more rearward than the shaft center 78a of the secondary shaft 78. The diameter of the secondary pulley 76 is larger than the diameter of the primary pulley 72. The uppermost end of the electric motor 26 is higher than the uppermost end of the secondary pulley 76, and the lowermost end of the electric motor 26 is lower than the uppermost end of the secondary pulley 76. The rearmost end of the electric motor 26 is positioned more frontward than the rearmost end of the primary pulley 72. The electric motor 26 is disposed in an available space around the primary pulley 72 and the secondary pulley 76 in a compact manner.

Next, the operation of the engine unit 20 will be described.

First, the operation of the engine unit 20 at the time of starting the motorcycle 1 will be described. When the crankshaft 13 rotates in the direction indicated by arrow X1 in FIG. 3, the secondary shaft 78 rotates in the direction indicated by arrow X2 in FIG. 3 because the second gear 15b of the crankshaft 13 and the secondary gear 75 of the secondary shaft 78 are in mesh with each other. Because the belt 80 is wrapped around the secondary pulley 76, which is attached to the secondary shaft 78, and the primary pulley 72, which is attached to the primary shaft 74, the primary shaft 74 rotates in the direction indicated by arrow X3 in FIG. 4 when the secondary shaft 78 rotates in the above-described way. At the time of starting the motorcycle 1 of the present embodiment, the transmission gear ratio of the CVT 70 is controlled to be low gear, which is the maximum transmission gear ratio, by the electric motor 26, so the number of revolutions of the primary shaft 74 becomes smaller than the number of revolutions of the crankshaft 13.

Also, when the crankshaft 13 rotates in the direction indicated by arrow X1 in FIG. 3, the shaft portion 19a of the second balancer 19 rotates in the direction indicated by arrow X4 in FIG. 3, because the first gear 15a of the crankshaft 13 is in mesh with the gear portion 19b of the second balancer 19. In addition, because the gear portion 19b of the second balancer 19 is in mesh with the first ring gear 44 of the ring gear 42, the main portion 48 of the ring gear 42 rotates in the direction indicated by arrow X5 in FIG. 3. Moreover, because the second ring gear 46 of the ring gear 42 is in mesh with the planetary gears 52, the support shafts 56 of the planetary carrier 54 rotate in the direction indicated by arrow X6 in FIG. 4. Furthermore, because the planetary gears 52 are in mesh with the sun gear 50, the rotary shaft 58 to which the sun gear 50 is attached rotates in the direction indicated by arrow X7 in FIG. 4. In a condition in which the number of revolutions of the rotary shaft 58 is low and the centrifugal clutch 22 is disengaged, the planetary gears 52 are rotating but are not revolving. That is, the mechanical power of the crankshaft 13 is not transmitted to the planetary carrier 54, which are coupled to the planetary gears 52, and the planetary carrier 54 and the output shaft 90, which is coupled to the planetary carrier 54, are not rotating.

When the number of revolutions of the rotary shaft 58 becomes higher than a predetermined number of revolutions, the centrifugal clutch 22 is engaged. Because the number of revolutions of the primary shaft 74 is lower than the number of revolutions of the rotary shaft 58, the number of revolutions of the rotary shaft 58 is lowered when the centrifugal clutch 22 is engaged. When the number of revolutions of the rotary shaft 58 becomes lower, the planetary gears 52 revolve while they are rotating. That is, the planetary carrier 54, which is coupled to the planetary gears 52, and the output shaft 90 rotate in the direction indicated by arrow X8 in FIG. 3. In this way, the mechanical power of the crankshaft 13 is transmitted to the output shaft 90.

First, the operation of the engine unit 20 at the time of gear shifting of the motorcycle 1 will be described. By continuously reducing the transmission gear ratio of the CVT 70 by the electric motor 26 while the motorcycle 1 is traveling, the number of revolutions of the primary shaft 74 is lowered. Accordingly, the number of revolutions of the rotary shaft 58, which is connected to the primary shaft 74 via the centrifugal clutch 22, becomes lower. When the number of revolutions of the rotary shaft 58 becomes lower, the number of revolutions of the planetary carrier 54 and the output shaft 90 becomes higher. In this way, the mechanical power of the crankshaft 13 is transmitted to the output shaft 90.

Figure 5:
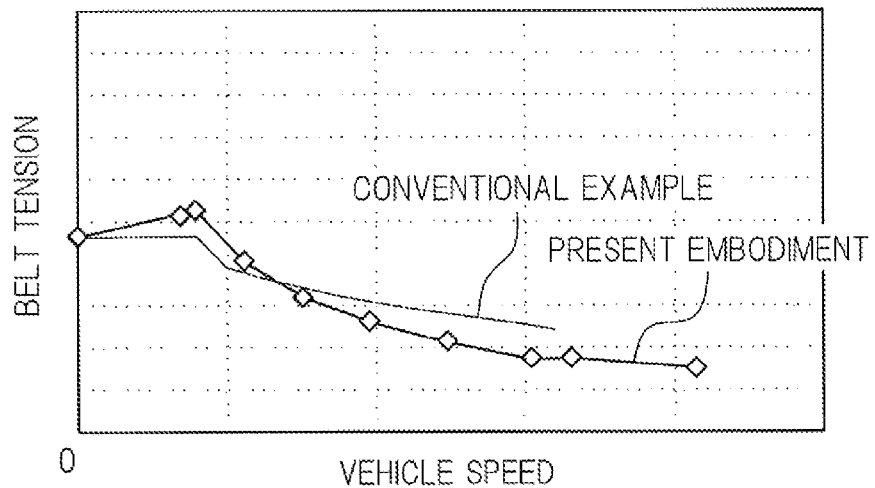
FIG. 5 is a characteristic diagram illustrating the relationship between vehicle speed and tension to the belt.
Figure 6:
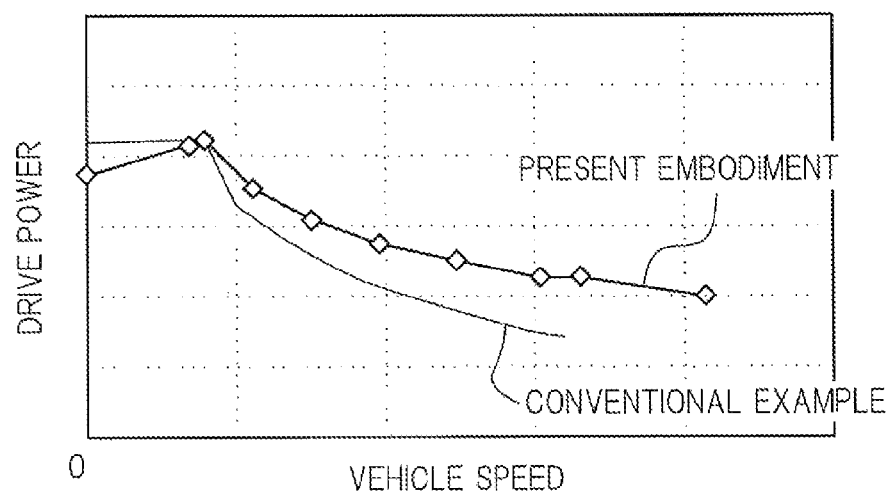
FIG. 6 is a characteristic diagram illustrating the relationship between vehicle speed and mechanical power of the output shaft.

Next, the characteristics of the motorcycle 1 according to the present embodiment will be described below. FIG. 5 is a characteristic diagram illustrating one example of the relationship between vehicle speed and tension to the belt (hereinafter referred to as "belt tension") in the motorcycle 1 according to the present embodiment and a conventional motorcycle. FIG. 6 is a characteristic diagram illustrating one example of the relationship between vehicle speed and mechanical power of the output shaft (hereinafter referred to as "drive power") in the motorcycle 1 according to the present embodiment and the conventional motorcycle. Note that the conventional motorcycle here means a motorcycle of a type that transmits mechanical power from the crankshaft to the output shaft only through the CVT. As illustrated in FIG. 5, in the low-speed range, the motorcycle 1 according to the present embodiment and that of the conventional motorcycle show almost the same level of belt tension, while in the high-speed range, the motorcycle 1 according to the present embodiment shows lower belt tension. Moreover, as illustrated in FIG. 6, in the low-speed range, the motorcycle 1 according to the present embodiment and that of the conventional motorcycle show almost the same level of drive power, while in the high-speed range, the motorcycle 1 according to the present embodiment shows higher drive power. Thus, the motorcycle 1 according to the present embodiment is capable of reducing the tension applied to the belt 80 and at the same time increasing the mechanical power of the output shaft 90 especially in the high-speed range.

Second Embodiment

Figure 7:
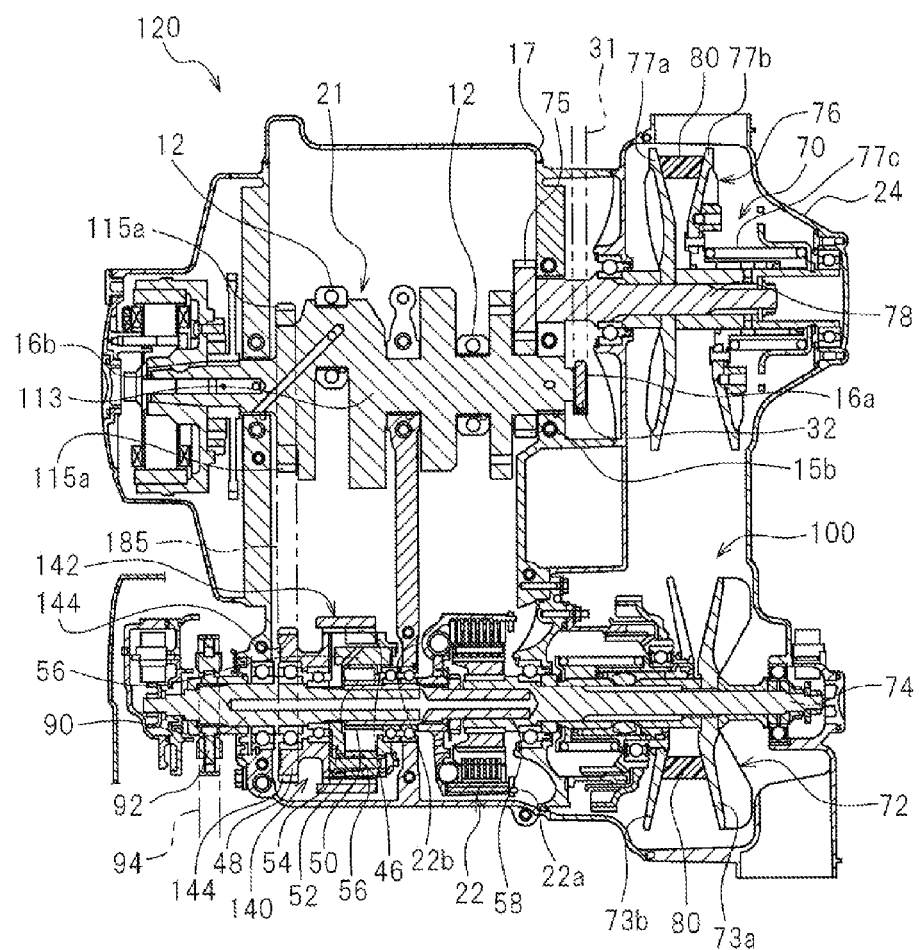
FIG. 7 is a horizontal cross-sectional view illustrating an engine unit according to another embodiment of the present invention.
Figure 7:
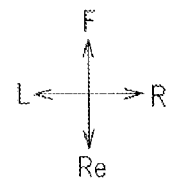

In the foregoing embodiment, the mechanical power of the crankshaft 13 is transmitted to the ring gear 42 through the second balancer 19, but the invention is not limited to such an embodiment. Hereinbelow, an engine unit 120 according to a second embodiment will be described. FIG. 7 is a horizontal cross-sectional view illustrating the engine unit 120 according to the second embodiment.

As illustrated in FIG. 7, a first gear 115a of a crankshaft 113 is coupled to a first ring gear 144 provided on a ring gear 142 of a planetary gear mechanism 140 by a chain 185 in the present embodiment. The ring gear 142 rotates by receiving the mechanical power of the crankshaft 113 that is transmitted through the chain 185. The rest of the configuration is substantially the same as the configuration in the first embodiment.

Third Embodiment

Figure 8:
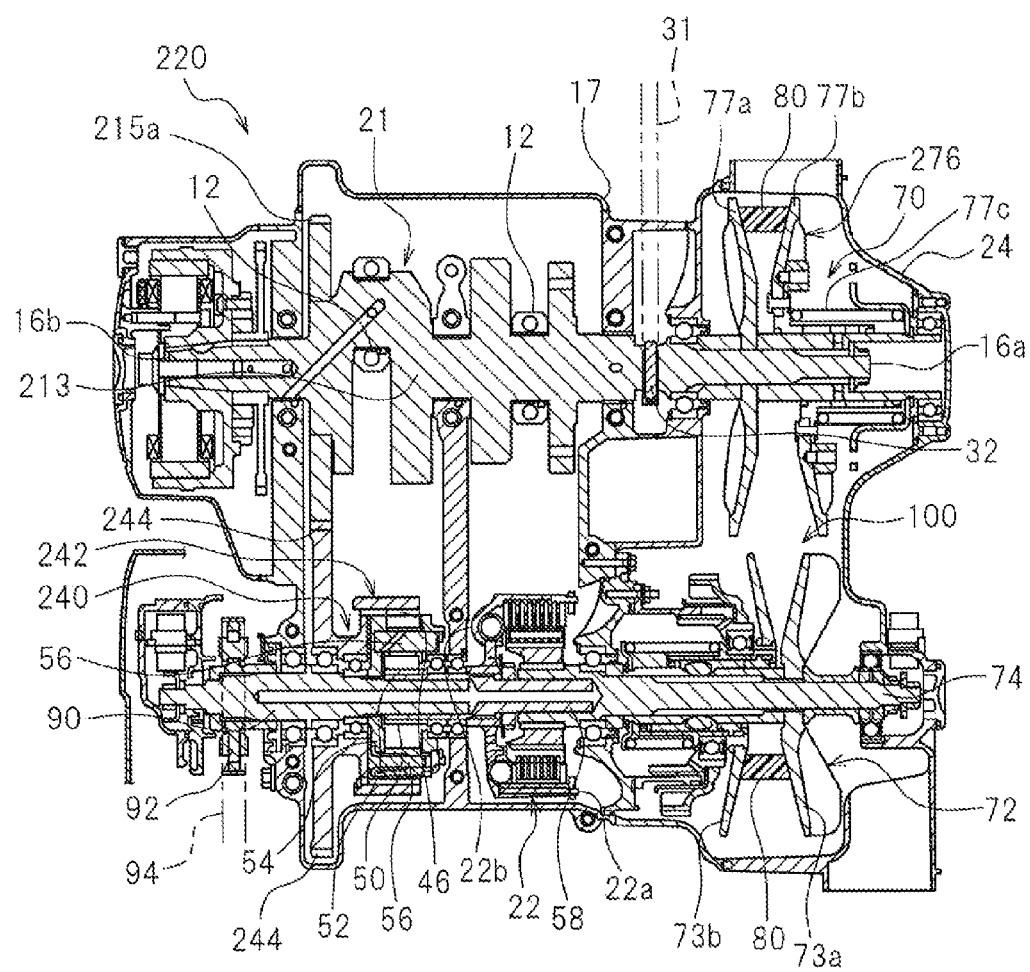
FIG. 8 is a horizontal cross-sectional view illustrating an engine unit according to yet another embodiment of the present invention.
Figure 8:
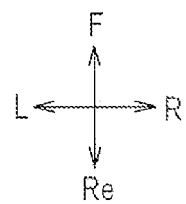

Next, an engine unit 220 according to a third embodiment will be described. FIG. 8 is a horizontal cross-sectional view illustrating the engine unit 220 according to the third embodiment.

As illustrated in FIG. 8, a first gear 215a of a crankshaft 213 and a first ring gear 244, which is provided on a ring gear 242 of a planetary gear mechanism 240, are in mesh with each other. A secondary pulley 276 is attached to the right of the crankshaft 213. Because the first gear 215a and the first ring gear 244 are in mesh with each other, the ring gear 242 also rotates in association with rotation of the crankshaft 213. The rest of the configuration is substantially the same as the configuration in the first embodiment. It should be noted that in the present embodiment, the crankshaft 213 rotates in the opposite direction to the direction in which the crankshaft 13 of the first embodiment rotates (i.e., in the opposite direction to that indicated by arrow X1 in FIG. 4).

As has been described above, in the motorcycle 1 according to the embodiments of the invention, the cyclic power transmission passage 100 comprises the crankshaft 13, the planetary gear mechanism 40, the rotary shaft 58, and the CVT 70, and the motorcycle 1 has the centrifugal clutch 22 disposed in the cyclic power transmission passage 100. Accordingly, when transmitting the mechanical power of the crankshaft 13 to the output shaft 90, the mechanical power of the crankshaft 13 can be transmitted to the output shaft 90 through the planetary gear mechanism 40 as well as through the CVT 70. As a result, in comparison with the case in which the mechanical power of the crankshaft is transmitted to the output shaft only through the belt-type continuously variable transmission as in the conventional cases, the tension to the belt 80 can be reduced when the same level of mechanical power is transmitted to the output shaft 90. Therefore, even with such a level of mechanical power that cannot be transmitted in the conventional configuration when taking the durability of the belt into consideration because of excessively high tension to the belt, the tension to the belt 80 is reduced in the above-described motorcycle 1. For this reason, the mechanical power can be transmitted to the output shaft 90 without applying an excessive load to the belt 80.

In the embodiments, the centrifugal clutch 22 is connected to the rotary shaft 58 and the primary shaft 74. Because the mechanical power of the crankshaft 13 is transmitted to the rotary shaft 58 and the primary shaft 74 through different passages to rotate the rotary shaft 58 and the primary shaft 74, the rotary shaft 58 and the primary shaft 74 rotate at different numbers of revolutions at the time of starting the engine 21. At this time, the centrifugal clutch 22, which is connected to the rotary shaft 58 and the primary shaft 74, is not engaged, so the planetary carrier 54 of the planetary gear mechanism 40 does not rotate. When the centrifugal clutch 22 is engaged, the rotary shaft 58 and the primary shaft 74 rotate at the same numbers of revolutions, causing the planetary gears 52 to revolve and thereby enabling the output shaft 90 to rotate.

In the embodiments, as illustrated in FIG. 2, each of the crankshaft 13, the rotary shaft 58, the output shaft 90, the primary shaft 74, and the secondary shaft 78 extends in a transverse direction, the primary pulley 72 is disposed to the right of the centrifugal clutch 22, and the planetary gear mechanism 40 is disposed to the left of the centrifugal clutch 22. By disposing the centrifugal clutch 22 between the primary pulley 72 and the planetary gear mechanism 40 in this way, the size of the cyclic power transmission passage 100 can be kept relatively small.

In the embodiments, each of the crankshaft 13, the rotary shaft 58, the output shaft 90, the primary shaft 74, and the secondary shaft 78 extends in a transverse direction, the rightmost end 22a of the centrifugal clutch 22 is positioned more rightward than the leftmost end 16b of the crankshaft 13, and the leftmost end 22b of the centrifugal clutch 22 is positioned more leftward than the rightmost end 16a of the crankshaft 13. Thus, the centrifugal clutch 22 is disposed between the rightmost end 16a and the leftmost end 16b of the crankshaft 13. As a result, the size of the cyclic power transmission passage 100 can be kept relatively small.

In the embodiments, as illustrated in FIG. 4, at least a portion of the centrifugal clutch 22 overlaps the primary pulley 72 as viewed from one side of the vehicle. Therefore, the cyclic power transmission passage 100 can be made compact in size.

In the embodiments, as illustrated in FIG. 4, at least a portion of the planetary gear mechanism 40 overlaps the primary pulley 72 as viewed from one side of the vehicle. Therefore, the cyclic power transmission passage 100 can be made compact in size.

In the first embodiment, the motorcycle 1 further has the second balancer 19 interposed between the crankshaft 13 and the ring gear 42. Therefore, vibrations of the engine 21 can be canceled out, and the mechanical power of the crankshaft 13 can be transmitted to the planetary gear mechanism 40 through the second balancer 19.

In the embodiments, the electric motor 26 overlaps neither the primary pulley 72 nor the secondary pulley 76 as viewed from one side of the vehicle. Therefore, the cyclic power transmission passage 100 can be made compact in size.

In the embodiments, at least a portion of the electric motor 26 is disposed above the primary pulley 72 as viewed from one side of the vehicle. Therefore, the cyclic power transmission passage 100 can be made compact in size.

In the embodiments, the primary shaft 74 is disposed behind the secondary shaft 78, and the electric motor 26 is disposed more frontward than the shaft center 74a of the primary shaft 74 and more rearward than the shaft center 78a of the secondary shaft 78. Therefore, the cyclic power transmission passage 100 can be made compact in size.

In the embodiments, each of the crankshaft 13, the rotary shaft 58, the output shaft 90, the primary shaft 74, and the secondary shaft 78 extends in a transverse direction, and the primary shaft 74 is disposed behind the secondary shaft 78. Therefore, the cyclic power transmission passage 100 can be made compact in size.

In the embodiments, each of the crankshaft 13, the rotary shaft 58, the output shaft 90, the primary shaft 74, and the secondary shaft 78 extends in a transverse direction, the primary shaft 74 is disposed behind the secondary shaft 78, and the shaft center 13a of the crankshaft 13 is positioned more frontward than the shaft center 74a of the primary shaft 74 and more rearward than the shaft center 78a of the secondary shaft 78. Therefore, the cyclic power transmission passage 100 can be made compact in size.

In the first and second embodiments, the motorcycle 1 further has the second gear 15b provided on the crankshaft 13, and the secondary gear 75 provided on the secondary shaft 78 and meshing with the second gear 15b. Because the second gear 15b of the crankshaft 13 and the secondary gear 75 of the secondary shaft 78 mesh with each other in this way, the mechanical power of the crankshaft 13 can be directly transmitted to the secondary shaft 78.

The invention claimed is:

1. A straddle-type vehicle comprising:
   an engine having a crankshaft;
   a planetary gear mechanism including
     a ring gear rotatable with the crankshaft,
     a sun gear disposed concentrically with the ring gear,
     at least two planetary gears that mesh with the ring gear and the sun gear, and
     a planetary carrier rotatably and revolvably supporting the planetary gears and rotating in association with revolution of the planetary gears;
   a rotary shaft rotating with the sun gear;
   an output shaft rotating with the planetary carrier;
   a belt-type continuously variable transmission including
     a primary shaft rotatable with the rotary shaft,
     a primary pulley attached to the primary shaft,
     a secondary shaft rotatable with the crankshaft,
     a secondary pulley attached to the secondary shaft, and
     a belt wrapped around the primary pulley and the secondary pulley; and
   an actuator configured to change a transmission gear ratio of the belt-type continuously variable transmission;
   wherein the crankshaft, the planetary gear mechanism, the rotary shaft, and the belt-type continuously variable transmission form a cyclic power transmission passage;
   wherein a centrifugal clutch is disposed in the cyclic power transmission passage; and
   wherein the centrifugal clutch is connected between the rotary shaft and the primary shaft.

2. The straddle-type vehicle according to claim 1, wherein each of the crankshaft, the rotary shaft, the output shaft, the primary shaft, and the secondary shaft extends in a transverse direction.

3. The straddle-type vehicle according to claim 2, wherein:
   the primary pulley is disposed to either one of the left and right of the centrifugal clutch; and
   the planetary gear mechanism is disposed to the other one of the left and right of the centrifugal clutch.

4. The straddle-type vehicle according to claim 2, wherein:
   a rightmost end of the centrifugal clutch is positioned more rightward than a leftmost end of the crankshaft; and
   a leftmost end of the centrifugal clutch is positioned more leftward than a rightmost end of the crankshaft.

5. The straddle-type vehicle according to claim 1, wherein at least a portion of the centrifugal clutch overlaps the primary pulley as viewed from one side of the vehicle.

6. The straddle-type vehicle according to claim 1, wherein at least a portion of the planetary gear mechanism overlaps the primary pulley as viewed from one side of the vehicle.

7. The straddle-type vehicle according to claim 1, further comprising a balancer interposed between the crankshaft and the ring gear.

8. The straddle-type vehicle according to claim 1, wherein the actuator overlaps neither the primary pulley nor the secondary pulley as viewed from one side of the vehicle.

9. The straddle-type vehicle according to claim 1, wherein at least a portion of the actuator is disposed above the primary pulley as viewed from one side of the vehicle.

10. The straddle-type vehicle according to claim 1, wherein:
the primary shaft is disposed behind the secondary shaft; and
the actuator is disposed more frontward than the shaft center of the primary shaft and more rearward than the shaft center of the secondary shaft.

11. The straddle-type vehicle according to claim 1, wherein:
each of the crankshaft, the rotary shaft, the output shaft, the primary shaft, and the secondary shaft extends in a transverse direction; and
the primary shaft is disposed behind the secondary shaft.

12. The straddle-type vehicle according to claim 1, wherein each of the crankshaft, the rotary shaft, the output shaft, the primary shaft, and the secondary shaft extends in a transverse direction.

13. The straddle-type vehicle according to claim 12, wherein:
the primary shaft is disposed behind the secondary shaft; and
the shaft center of the crankshaft is positioned more frontward than the shaft center of the primary shaft and more rearward than the shaft center of the secondary shaft.

14. The straddle-type vehicle according to claim 1, further comprising a first gear provided on the crankshaft, and a second gear provided on the secondary shaft and meshing with the first gear.

* * * * *